Nov. 4, 1969 J. F. SHERWOOD 3,476,355

MAGNETIC VALVE

Filed Jan. 15, 1968 2 Sheets-Sheet 1

INVENTOR.
JOHN F. SHERWOOD
BY
Bertha L. MacGregor
ATTORNEY

Nov. 4, 1969    J. F. SHERWOOD    3,476,355
MAGNETIC VALVE

Filed Jan. 15, 1968    2 Sheets-Sheet 2

INVENTOR.
JOHN F. SHERWOOD
BY
Bertha L. MacGregor
ATTORNEY

United States Patent Office 3,476,355
Patented Nov. 4, 1969

3,476,355
MAGNETIC VALVE
John F. Sherwood, 130 S. Sandalwood Place,
Glendora, Calif. 91740
Filed Jan. 15, 1968, Ser. No. 697,897
Int. Cl. F16k 31/08, 1/18
U.S. Cl. 251—65                    6 Claims

ABSTRACT OF THE DISCLOSURE

A magnetic valve for controlling the flow of air, water or light fluids comprises a valve housing made of insulating material having an inlet and an outlet, and a single moving part in the housing consisting of a freely movable valve closing and opening disc of magnetic material normally supported by the housing over the valve outlet.

---

A control member is located externally of the housing adjacent the valve outlet. It may be a rotated permanent magnet or an electro-magnet.

The valve opening and closing disc is alternately attracted and repelled by the control member. When the facing poles of the control member and disc are alike, the disc is repelled and caused to turn or "flip over" bodily from its valve closing position to its valve opening position, and vice versa. When the facing poles of the two members are unalike, the disc is attracted to the control member and is held in position until the polarity of the control member is again changed.

This invention relates to a magnetic valve which may be used to control the flow of air, water or other light fluids.

The main object of the invention is to provide a valve which comprises a single moving part in the valve housing, and a control member in the form of a rotated permanent magnet or an electro-magnet. In the latter, polarity is changed by reversing the polarity of the coil on the electro-magnet.

The single moving part is located in the housing over the valve outlet. Said part is the valve closing and opening means, preferably in the form of a disc made of magnetic material which is alternately attracted and repelled by the control member and thereby caused to turn or "flip over" from its valve closing position to its valve opening position, and vice versa.

The construction is exceedingly simple, and devoid of the usual valve stem and actuating parts required in conventional valves.

The objects and advantages of the invention will be apparent from the drawings and following description.

Figure 1:
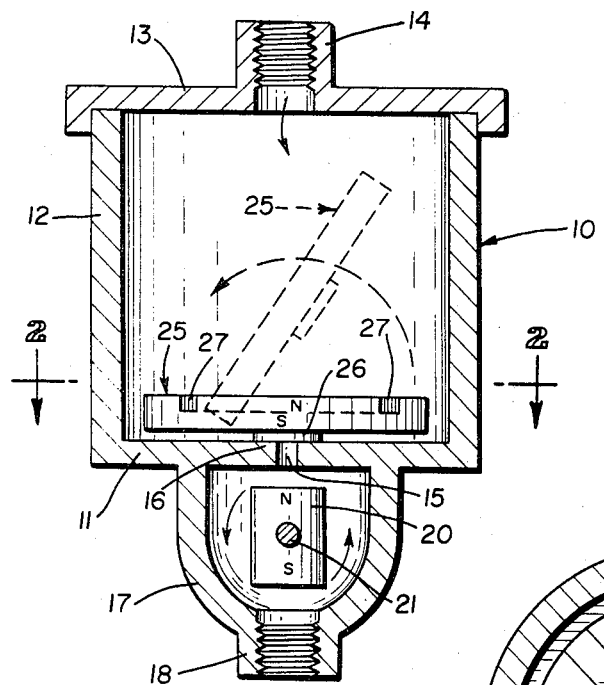
FIG. 1 is a vertical sectional view of a magnetic valve embodying my invention, showing the valve closing and opening member in valve closing position in solid lines and in the act of turning over in broken lines.
Figure 2:
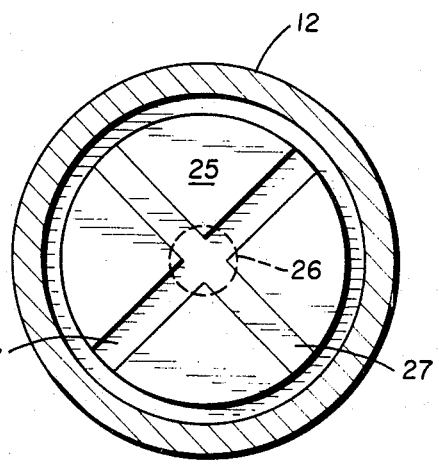
FIG. 2 is a horizontal sectional view in the plane of the line 2—2 of FIG. 1.
Figure 3:
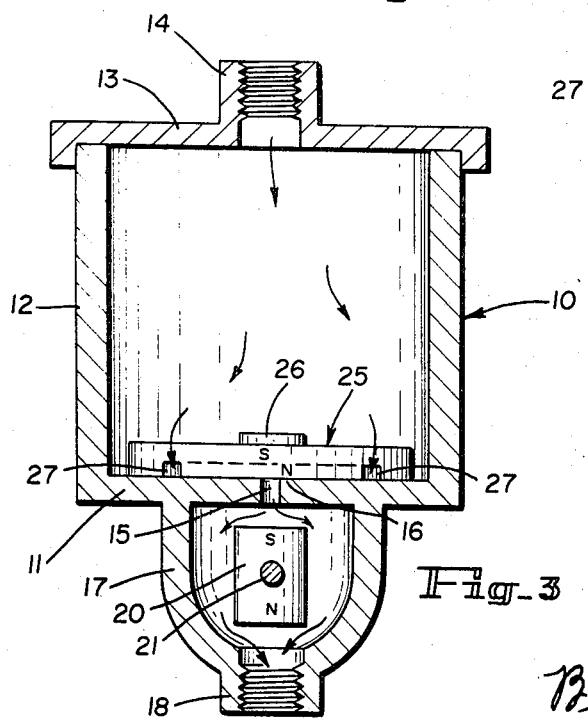
FIG. 3 is a view similar to FIG. 1 showing the valve closing and opening member in valve opening position.

In one embodiment of the invention, shown in FIGS. 1–3, a housing 10, preferably circular in horizontal cross section, comprises a bottom 11, vertical side walls 12, detachable cover, 13, and internally threaded air or fluid inlet 14. The reference to "bottom," "side," etc. are of course related to the position of the parts shown in the drawings, but obviously the structure may be otherwise disposed in use. The bottom 11 is provided with a central opening 15 for passage of air or fluid, and the area 16 of the upper surface of the bottom 11 surrounding the opening 15 constitutes the valve seat.

The bottom 11 may be integral with a cup-shaped outlet casing 17 provided with an internally threaded outlet 18, as shown. The casing may be formed separately and be connected to the bottom by any suitable means. The casing 17 encloses a rotated permanent magnet 20 fixed on a rotatable shaft 21. The shaft 21 extends outwardly through the casing 17 to be rotated by any suitable machanism (not shown).

A freely movable permanent magnet in the form of a disc 25 constitutes a valve opening and closing member. It is provided on one of its major surfaces with a centrally located elastomeric valve closing member 26 adapted to seat on the seat area 16 surrounding the opening 15 in the valve housing bottom 11 as shown in FIG. 1. On its opposite major surface the disc 25 is provided with communicating channels 27 through which air or fluid can pass from the interior of the housing 10 to the opening 15 in the bottom 11 when the disc 25 is in the valve opening position of FIG. 3. The housing 10 is slightly greater in diameter and height than the diameter of the disc 25.

As shown in FIG. 1, the permanent magnet control member north pole is facing the south pole side of the magnetic disc 25, thus attracting the disc and holding the valve closing member 26 down on the surface 16 surrounding the valve opening 15 to close the valve. As soon as the magnetic control member 20 has been turned by rotation of the shaft 21, so that its south pole faces the south pole side of the freely movable disc 25, the latter is repelled and instantly makes a combined rising and turning movement as shown in broken lines in FIG. 1, resulting in the valve opening position shown in FIG. 3, where the north pole side of the disc then faces the south pole side of the rotated control member 20. Fluid then passes out through channels 27 through opening 15 in the bottom 11, through outlet casing 17 to outlet 18.

Figure 4:
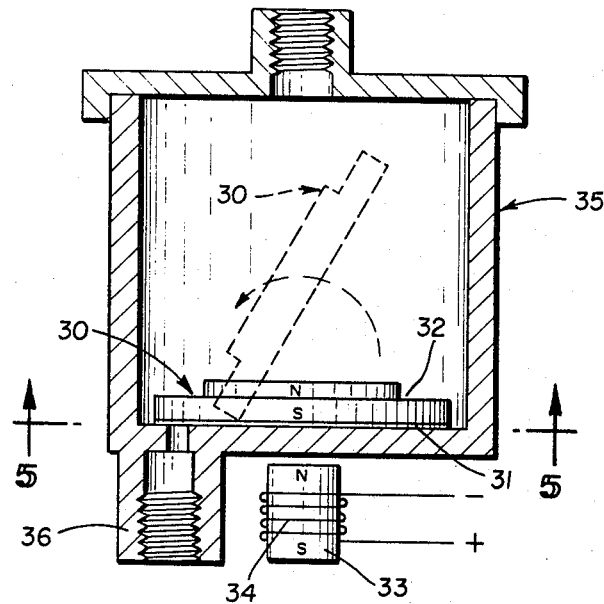
FIG. 4 is a vertical sectional view showing a modified form of valve housing and of the valve closing and opening member therein, and a modified form of control device, namely, an electro-magnet.
Figure 5:
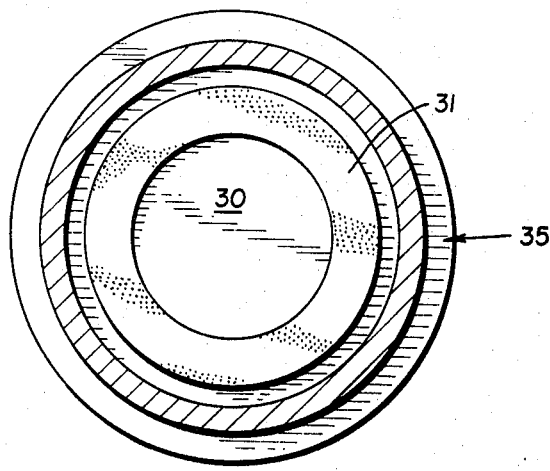
FIG. 5 is a horizontal sectional view in the plane of the line 5—5 of FIG. 4.

In the modification of the invention shown in FIGS. 4 and 5, an electro-magnet 33 with winding 34 has been substituted for the rotated magnetic control member 20 and shaft 21. In the electro-magnetic control member 33, polarity is changed by reversing the polarity of the coil 34. It may be used in the valve structure of FIGS. 1–3, as well as in the invention as shown in FIGS. 4 and 5.

The modified form of valve closing and opening disc 30 is a permanent magnet, like disc 25, but is provided with an annular valve colsing plug 31 of elastomeric material on one side and an annular marginal channel 32 on the opposite side for permitting air or fluid to pass from the interior of the housing to the housing outlet. This form of valve opening and closing disc permits the housing 35 to be provided with an outlet 36 located near one side of the bottom instead of the centrally located outlet 18 of the previously described form of the invention. This arragement also obviates the necessity for providing the housing with a cup-like casing 17 such as shown in FIGS. 1 and 3, for housing the control member.

The construction described obviates the need for conventional valve seats and valve stems and plugs which require machined cooperating parts to ensure positive valve closing and opening.

Changes may be made in details of construction and form of parts without departing from the scope of the invention as defined by the appended claims.

I claim:
1. A magnetic valve comprising
  (a) a housing having an inlet and an outlet,

(b) a permanently magnetic freely movable valve closing and opening member having opposite side surfaces one of which closes the valve outlet when covering the outlet and the other of which permits passage of air or fluid from the interior of the housing through said outlet when the member has been turned over, (c) a magnetic control member located outside of the housing, and (d) means for reversing the polarity of the control member to repel the movable valve member in the housing and cause said member to turn over from one side to the other to alternately open or close the valve outlet.

2. The magnetic valve defined by claim 1, in which the valve closing and opening member is a disc having a diameter slightly smaller than the internal diameter and height of the housing.

3. The magnetic valve defined by claim 1, in which the valve closing and opening member is a disc provided on one of its major surfaces with valve outlet covering means and on the opposite major surface with channels permitting passage of air or water from the interior of the housing to the valve outlet.

4. The magnetic valve defined by claim 1, in which the magnetic control member located outside of the housing comprises a permanent magnet, and means for rotating the magnet for alternately turning the north and south poles to face the movable valve member in the housing.

5. The magnetic valve defined by claim 1, in which the magnetic control member located outside of the housing comprises an electromagnet and coil in which the polarity of the magnet is reversed by reversing the electrical current to the coil.

6. A magnetic valve comprising (a) a housing of insulating material having an inlet and an outlet, (b) a cup shaped casing having an outlet and connected to the housing in communication with the housing outlet, (c) a permanently magnetic freely movable valve closing and opening member having opposite side surfaces one of which closes the valve outlet when covering the outlet and the other of which permits passage of air or fluid from the interior of the housing through said outlet when the member has been turned over, (d) a magnetic control member located in the cup shaped casing, and (e) means for reversing the polarity of the control member to repel the movable valve member in the housing and cause said member to turn over from one side to the other to alternately open or close the valve outlet.

References Cited

UNITED STATES PATENTS

| | | | |
|---|---|---|---|
| 2,569,800 | 10/1951 | Cataldo | 251—65 |
| 2,646,071 | 7/1953 | Wagner | 251—65 |
| 3,265,062 | 8/1966 | Hesse | 251—65 |
| 3,275,011 | 9/1966 | Berezansky et al. | 251—65 |
| 3,355,140 | 11/1967 | Andersen | 251—65 |
| 3,355,728 | 11/1967 | Smith | 251—65 XR |

RONALD FELDBAUM, Primary Examiner